United States Patent Office 3,046,400
Patented July 24, 1962

3,046,400
MEASUREMENT OF RADIATION
Jean A. Paymal, Neuilly-sur-Seine, France, assignor to Compagnie de Saint-Gobain, Paris, France
No Drawing. Filed May 29, 1959, Ser. No. 816,662
Claims priority, application France June 2, 1958
18 Claims. (Cl. 250—83)

This invention relates to the measurement of ionizing radiation.

The different applications of ionizing radiation are numerous and include among other things, the sterilization of foods and pharmaceuticals and the treatment of rubber or synthetic plastics. Various processes and objects are responsive to different quantities of radiation and it is therefore advisable and, indeed, necessary to have some convenient method for measuring the quantity of radiation which is directed upon them. It is an object of this invention to supply improved glass which is responsive by color change to quantities of radiation and which has advantages over previously known glasses which will be hereinafter set forth.

Further objects of the invention are: To make glass responsive, by change of color, to the quantity, and but little responsive to the intensity of ionizing radiation; to improve the radiation responsive glasses having manganese content; to render manganese-containing glass more color stable after radiation ceases; and to use such manganese-containing glass in the determination of the quantity of ionizing radiation existing in a particular area.

The invention has among its numerous advantages the production of a superior glass responsive by color change visible to the eye and comparable with a standard scale to reveal at a glance the quantity of radiation of ionizing type available in a given place.

Different glasses lend themselves well to the measurement of quantities of irradiation due to strong variations in the transmission of light which they undergo under the influence of ionizing rays. However, their use involves the difficulty of overcoming a number of imperfections. In using them one may, for example, relate the variation of optic density of a glass to the quantity of radiation received, so as to constitute an exact measurement of that quantity. It is also possible, and easier, to choose a glass in which the change of color, or variations of color intensity, are produced by the irradiation and are sufficiently distinct for the eye to observe them directly or by comparison with the color scale or a standard. It has been known to use manganese containing glass for this purpose.

The coloring effect of manganese on glass is well known. In most kinds of glass, it develops a purple hue which is attributable to manganese ions of high valence. The low valences of this ion do not have the same coloring effect. Thus, the color of a manganese glass depends upon the choice of the manganese compounds which are introduced into the composition and to the conditions of reduction, oxidation, or neutrality under which the fusion of the glass is carried out. The exposure of manganese glass to ionizing radiation liberates a certain number of electrons, which are ejected from different atoms in the constitution of the glass and, particularly, from atoms of manganese which are found in a state of low valence. These atoms become thereby a higher valence manganese and confer on the glass a purple hue, or they reinforce that hue if it already exists and make it stronger. The electrons liberated may either fix themselves upon captor atoms or may be arrested in certain locations of the structure of the glass.

The color developed in a manganese glass under the influence of ionizing radiations is generally unstable and has a tendency to fade even at atmospheric temperature when the radiation is no longer present. It depends especially not only on the quantity of radiation but on the intensity of radiation. The electrons fixed on the captor atoms or arrested in the glass may be liberated anew in the course of irradiation and after irradiation and fix themselves on other atoms and in particular on atoms of manganese. The instability of the color produced by radiation and the influence of radiation intensity on color, constitute defects which should be reduced or eliminated if a glass is to be used with that precise accuracy to measure quantities of radiation by methods which are simple and sure.

The objects are attained, in general, by manganese glass containing a metallic, radiation intensity compensating agent. These agents are present, or at least are computed, as their oxides, exactly as other metallic ingredients of glass are computed.

The invention involves using for the measurement of quantities of radiation manganese glasses which contain at least one intensity compensating agent, in particular a compensating metal having a coloring effect, this compensating element being preferably chosen from among iron, tin, vanadium and chromium. Such glasses under the influence of ionizing radiation take a color which is practically stable and independent of the intensity of the radiation, and provide a color which is the more intense as the quantity of irradiation received is higher.

I have now established that the addition of radiation intensity compensators to glasses within certain limits of concentration provides a color which develops under ionizing radiation and is directly responsive in optical density to the quantity of radiation received, being also practically independent of the intensity of that radiation. In these new glasses also, the fading of color after irradiation is much reduced, compared to manganese glasses known to the prior art.

It is to be understood, that the manganese and the radiation compensating agent are present as adjuvants to known glasses, and that all known glasses when containing adequate quantities of manganese and intensity compensating agents are useful in the process. Glass which contains by weight percent .3 to 3% of manganese, computed as MnO, and .05 to .3% of iron, computed as $Fe_2O_3$, or .5 to 4% of tin, computed as $SnO_2$ are particularly useful. When vanadium and chromium are used as the adjuvants, glasses which contain .3 to 2% of manganese, computed as MnO and 0.2 to 2% of vanadium, computed as $V_2O_5$ or .02 to .2% of chromium, computed as $Cr_2O_3$ are useful in this process. It must be understood that these adjuvants can be used alone or in combination with each other. It has been established by the applicant that manganese glass containing iron in the percentages listed above assumes a color which is substantially independent of the intensity of radiation between 10,000 r./h. and 300,000 r./h.

The applicant has also established that the combination of vanadium and chromium with the manganese glass increases the sensitivity of the glass to ionizing radiation so that an equal coloration is obtained with a smaller quantity of radiation, the difference between quantities, applied with different intensities of radiation but yielding an identical color, being smaller. The presence of vanadium or chromium also reduces the fading of color after irradiation but in a proportion which is less than that of iron or tin.

The following four examples give the constitution by weight analysis of glasses which are successfully employable in the invention. In each case, the raw materials were mixed together and fused in a furnace at a temperature of about 1,200° C., then fined at about 1,450° C., and cooled to about 900° C. at which temperature they were poured on a table forming a disc having a thickness of approximately 5 mm.

In making up the compositions prior to fusing, the manganese was introduced into the composition as manganous chloride, the iron was introduced as Fe₂O₃, the tin was introduced as SnO₂ and the vanadium was used as V₂O₅. For practical use in the measurement of radiation, these glasses have been made up in plates having a dimension of 20 mm. by 20 mm. and 5 mm. thick; they have also been made up in discs of 15 to 20 mm. diameter and a thickness of 5 mm. In both these cases, they have been used to measure radiation between 50,000 and 5,000,000 roentgens with entire success in all portions of the range. If one wishes to measure quantities of radiation inferior to 50,000 roentgens, the thickness of the glass plates should be increased.

EXAMPLE I

A glass was selected which contained the following composition by weight: $SiO_2$ 71%, $Al_2O_3$ .5%, $CaO$ 10.8%, $MgO$ 3.0%, $Na_2O$ 14%, $MnO$ .6%, $Fe_2O_3$ .1%. Plates having this composition and being 20 mm. by 20 mm. by 4 mm. were subjected to different doses of gamma radiation, by a source of cobalt 60, being in each case 80,000 r./h. An hour after the irradiation, the difference in optical density between the irradiated piece and a test piece of the same glass of the same size and shape, which had not been irradiated, was made. This test was made by means of a spectrophotometer. This test can also be made on a photocolorometer. The wave length sued was 550 mu. Exposures of from 100,000 to 2,500,000 roentgens were made, and after the irradiation the test piece containing the compensating agent was compared with the same glass which did not contain it. Thus, in the present example, the $Fe_2O_3$ was the compensating agent used and the comparative glass was of the same composition except that the $Fe_2O_3$ was omitted.

| Exposures, roentgens: | Difference in optical density |
|---|---|
| 100,000 | 0.06 |
| 300,000 | 0.17 |
| 600,000 | 0.30 |
| 1,000,000 | 0.43 |
| 2,500,000 | 0.66 |

EXAMPLE II

A glass was selected which had the following composition by weight: $SiO_2$ 67.9%, $Al_2O_3$ .5%, $CaO$ 9.5%, $MgO$ 3.0%, $Na_2O$ 17%, $MnO$ .6%, $V_2O_5$ 1.5%. In this case, the compensating agent was vanadium oxide. Test pieces of this composition having dimensions 20 by 20 by 3 mm. were submitted to various doses of gamma radiation emitted by a source of cobalt 60, the intensity of the irradiation being in each case 80,000 r./h. One hour after the end of the irradiation the difference in optical density between the irradiated test pieces and a non-irradiated test piece was made as in Example I. The following differences in optical density were observed, corresponding to the quantity of roentgens which had been delivered to the test piece.

| Exposures, roentgens: | Difference of optical density |
|---|---|
| 100,000 | 0.09 |
| 300,000 | 0.22 |
| 600,000 | 0.37 |
| 1,000,000 | 0.52 |
| 2,500,000 | 0.87 |
| 5,000,000 | 1.15 |
| 7,000,000 | 1.25 |

EXAMPLE III

Plates of glass identical with the test pieces of Example I were selected and were irradiated with an exposure of $2.55 \times 10^6$ roentgens with different intensities of radiation. For different values of the intensity of the radiation, the following values in difference of optical density between the irradiated test pieces and a non-irradiated test piece of the same composition were discerned.

| Intensity of radiation, r./h.: | Difference of optical density |
|---|---|
| 10,000 | 0.68 |
| 40,000 | 0.68 |
| 110,000 | 0.67 |
| 160,000 | 0.67 |
| 320,000 | 0.69 |

EXAMPLE IV

The test of Example III was repeated with glass plates identical with those of Example II. These were given a common exposure of 600,000 roentgens and exhibited the following differences of optical density when compared with a non-irradiated piece.

| Intensity of radiation, r./h.: | Difference of optical density |
|---|---|
| 10,000 | 0.35 |
| 80,000 | 0.35 |
| 320,000 | 0.37 |

Examples III and IV show that the results are practically independent of the intensity of radiation when a radiation intensity compensating agent is used in the glass.

EXAMPLE V

Three glass plates of identical composition and size were numbered 1, 2 and 3. Plate No. 2 was identical with that of Example I having been stabilized by the addition of iron. It had a thickness of 4 mm. Plate No. 1 had the same composition as plate No. 2 except that iron was omitted. Its dimensions were the same. Plate No. 3 had the same composition as Example II, having been stabilized by vanadium. Its thickness was 3 mm. These three plates were irradiated with an exposure of 3,000,000 roentgens. Then their optical density was measured one hour after the end of the irradiation and finally 24 hours later. The following values, according to the difference of optical density between the irradiated test pieces, were taken at the end of the hour and at the end of the 24 hours. The results are as follows:

| | Difference of Optical Density | | Variation of Optical Density in 24 hours |
|---|---|---|---|
| | 1 hour after end of irradiation | 24 hours after end of irradiation | |
| Glass 1 (without stabilizer) | .740 | .622 | .118 |
| Glass 2 (stabilized by iron) | .680 | .618 | .062 |
| Glass 3 (stabilized by vanadium) | .990 | .940 | .050 |

This example shows that iron slightly lowers the sensitivity of the glass but stabilizes it, and that vanadium both improves sensitivity and the stability.

This example shows that the addition of the four metals to the manganese glass not only compensates for intensity variation but stabilizes the glass.

Example V permits us to compare the results obtained with a manganese glass without stabilizer, a manganese glass of otherwise identical composition containing iron, and a manganese glass of otherwise identical composition containing vanadium. With the unstabilized glass, the optical density dropped from .740 to .622 between 1 and 24 hours after the exposure. Glass No. 2 which had been stabilized with iron was much more stable, the decrease being only from .680 to .618 in the same period. Glass No. 3 stabilized by vanadium, was yet more stable, passing under the same conditions from .990 to .940.

It will be observed that the iron slightly diminished sensitivity of the test because .680 is smaller than .740 but on the contrary, the vanadium improved both the sensitivity and the stability, .990 being greater than .740.

It is to be observed that in all the examples hereinbefore, the differences in optical density show the difference between an irradiated test piece and a test piece of identical composition and size which has not been irradiated.

For the purposes of this invention, the glass may contain only a small quantity of manganese and the stabilizer. For example, from a few hundreds of a percent to several percent is a satisfactory range.

An advantage of the invention is manganese glass which is directly responsive by change in optical density to quantities of radiation which it receives, but whch is not responsive to the intensity of that radiation.

The discovery of intensity compensation during exposure is a major advantage of this invention. Another major advantage is stabilization of the irradiated piece.

As many apparently widely different embodiments of the present invention may be made without departing from the spirit and scope thereof, it is to be understood that the invention is not limited to the specific embodiments.

What is claimed is:

1. A method of determining the quantity of ionizing radiation which comprises exposing manganese glass containing a radiation intensity compensating agent to ionizing radiation, and determining the change in optical density produced by the exposure.

2. A method of determining the quantity of ionizing radiation which comprises exposing manganese glass containing a radiation intensity compensating agent from the class consisting of iron, tin, vanadium and chromium to ionizing radiation, and determining the change in optical density produced by the exposure.

3. A method of determining the quantity of radiation existing in a place which comprises exposing glass, containing from a few tenths of a percent to several percent of manganese calculated as MnO, and from a few hundredths of a percent to a few percent of a metal from the class consisting of iron, tin, vanadium, and chromium, calculated as oxide, to ionizing radiation and determining the change in optical density produced by the exposure.

4. A method of determining the quantity of radiation existing in a place which comprises exposing manganese glass containing from a few tenths of a percent to several percent of manganese, calculated as MnO, and .05 to 3% iron, calculated as $Fe_2O_3$, to ionizing radiation and determining the increase in optical density produced by the exposure.

5. A method of determining the quantity of radiation existing in a place which comprises exposing manganese glass containing from a few tenths of a percent to several percent of manganese, calculated as MnO, and .5 to 4% of tin, calculated as $SnO_2$, to ionizing radiation and determining the increase in optical density produced by the exposure.

6. A method of determining the quantity of radiation existing in a place which comprises exposing manganese glass containing from a few tenths of a percent to several percent of manganese, calculated as MnO, and .2 to 2% of vanadium, calculated as $V_2O_5$, to ionizing radiation and determining the increase in optical density produced by the exposure.

7. A method of determining the quantity of radiation existing in a place which comprises exposing manganese glass containing from a few tenths of a percent to several percent of manganese, calculated as MnO, and .02 to .2% of chromium, calculated as $Cr_2O_3$, to ionizing radiation and determining the increase in optical density produced by the exposure.

8. A detector of ionizing radiation comprising manganese glass containing as a radiation intensity compensating agent and fading stabilizer an oxide of a metal from the class consisting of iron, chromium, vanadium and tin, said glass being substantially unresponsive to radiation intensity and directly responsive by change in optical density to the quantity of radiation received by it.

9. A detector of ionizing radiation comprising a glass plate of uniform thickness consisting of manganese glass containing as a radiation intensity compensating agent an oxide of a metal from the class consisting of iron, chromium, vanadium and tin, said glass being substantially unresponsive to radiation intensity and directly responsive by change in optical density to the quantity of radiation received by it.

10. A detector of ionizing radiation comprising manganese glass containing up to several percent manganese, calculated as oxide, and from a few hundredths to several percent of metal from the class consisting of iron, chromium, vanadium and tin.

11. The detector of claim 8 in which the stabilizer is iron which is present between .05 and 3% Fe by weight, calculated as $Fe_2O_3$.

12. The detector of claim 8 in which the stabilizer is tin and is present in an amount constituting between .5 to 4% by weight, calculated as $SnO_2$.

13. The detector of claim 8 in which the stabilizer is vanadium which is present in an amount constituting between .2 and 2% by weight, calculated as $V_2O_5$.

14. The detector of claim 8 in which the stabilizer is chromium which is present in an amount constituting between .02 and .2% by weight, calculated as $Cr_2O_3$.

15. A detector of ionizing radiation comprising manganese glass containing a radiation intensity compensation agent and fading stabilizer and which is directly responsive by change in optical density to quantities of the radiation detected and is substantially unaffected by differences in intensity of the radiation.

16. A detector of ionizing radiation consisting essentially of manganese glass containing a radiation intensity compensating agent.

17. A detector of ionizing radiation consisting essentially of manganese glass containing a metallic radiation intensity compensating agent and fading stabilizer.

18. The method of determining the quantity of ionizing radiation in an area which comprises exposing manganese glass containing a metallic radiation intensity compensating agent to ionizing radiation in an area, and determining the change in optical density produced in the glass by the exposure.

References Cited in the file of this patent

UNITED STATES PATENTS

| | | |
|---|---|---|
| 15,665 | McCully | Sept. 2, 1856 |
| 29,020 | Trumball | July 3, 1860 |
| 2,394,493 | Schoenlamb | Feb. 5, 1946 |
| 2,440,048 | Hood | Apr. 20, 1948 |
| 2,655,452 | Barnes et al. | Oct. 13, 1953 |
| 2,708,242 | Ruben | May 10, 1955 |
| 2,800,589 | Levy | July 23, 1957 |
| 2,940,951 | Ruskin | June 14, 1960 |

OTHER REFERENCES

Day et al.: Chemical Dosimetry of Ionizing Radiations, Nucleonics, February 1951, pp. 34 to 45.

Schulman et al.: Measuring High Doses by Absorption Changes in Glass, Nucleonics, February, 1955, pp. 30 to 33.